United States Patent [19]

Unterborn

[11] Patent Number: 5,119,523
[45] Date of Patent: Jun. 9, 1992

[54] RETRACT TO PARK WINDSHIELD WIPER

[75] Inventor: Ralph J. Unterborn, Dayton, Ohio

[73] Assignee: General Motors Corporation, Detroit, Mich.

[21] Appl. No.: 716,181

[22] Filed: Jun. 17, 1991

[51] Int. Cl.⁵ ............................................. B60S 1/36
[52] U.S. Cl. ................................ 15/250.16; 15/250.23; 15/250.21
[58] Field of Search ............ 15/250.23, 250.32, 250.39, 15/250.15, 250.16, 25.17, 250.19, 250.21

[56] References Cited

U.S. PATENT DOCUMENTS

| | | | |
|---|---|---|---|
| 2,286,004 | 6/1942 | O'Shei | 15/250.15 |
| 2,356,424 | 8/1944 | Paton | 15/250.23 |
| 2,821,735 | 2/1958 | Perkins et al. | 15/250.23 |
| 3,143,754 | 8/1964 | Wolf | 15/250.23 |
| 3,660,862 | 5/1972 | Scinta | 15/250.23 |
| 4,570,283 | 2/1986 | Osterday | 15/250.21 |
| 4,641,390 | 2/1987 | Michalke | 15/250.23 |
| 4,780,926 | 11/1988 | Kondo et al. | 15/250.21 |
| 4,935,983 | 6/1990 | Yamamoto et al. | 15/250.16 |

FOREIGN PATENT DOCUMENTS 3405677  8/1984  Fed. Rep. of Germany ... 15/250.21

Primary Examiner—Harvey C. Hornsby
Assistant Examiner—Gary K. Graham
Attorney, Agent, or Firm—Patrick M. Griffin

[57] ABSTRACT

The passenger side wiper of a tandem pattern system, in order to reach sufficient area of a sloped windshield, must have an effective wiping length that is longer that the space available in which to depress park the wiper along the lower edge of the windshield. In order to achieve this, the passenger side wiper is provided with a blade assembly that extends and retracts in a parallel swinging motion that does not depart unacceptably from the normal blade to arm orientation. The blade retracts automatically, activated by the already provided depressed park action.

2 Claims, 2 Drawing Sheets

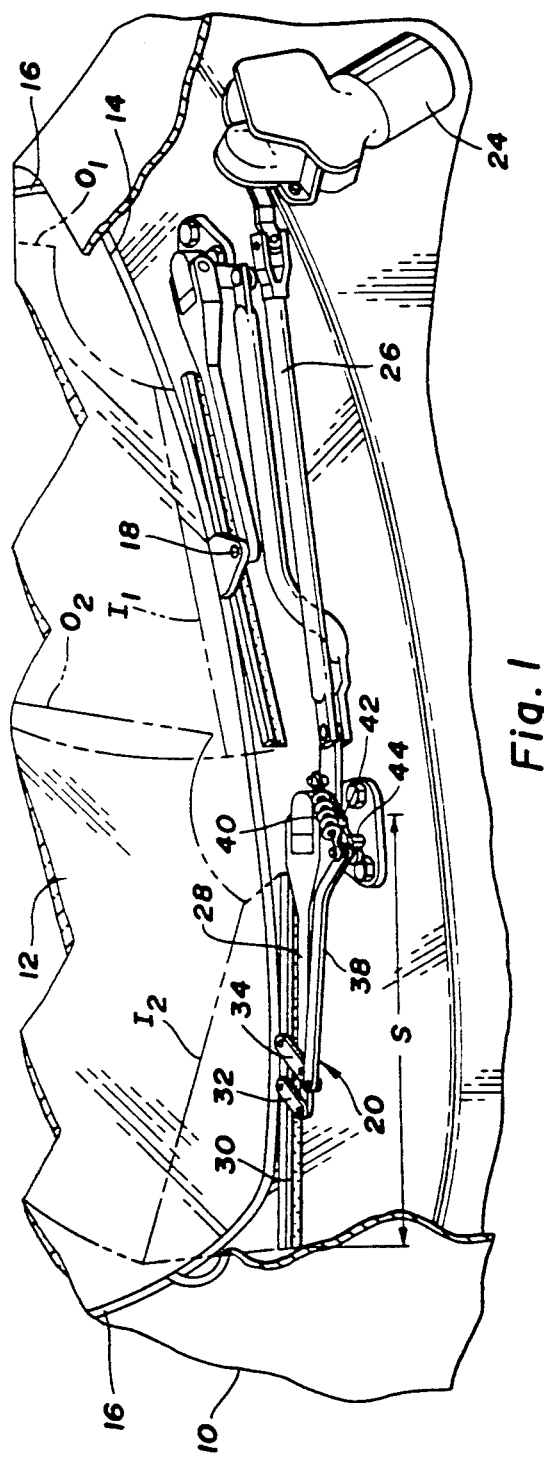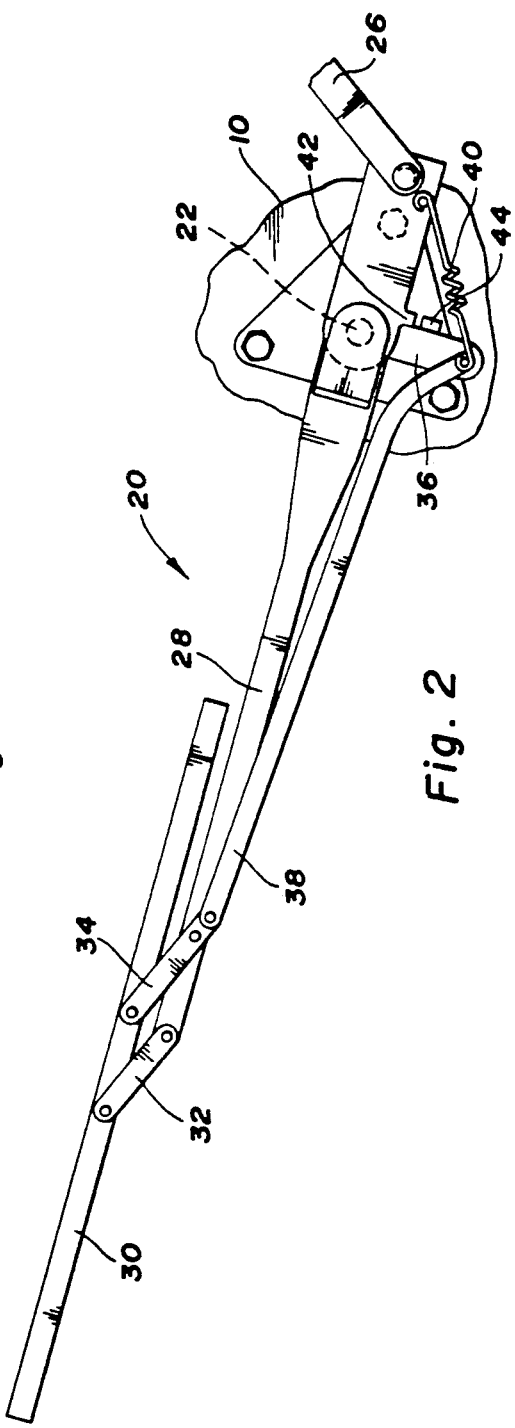

RETRACT TO PARK WINDSHIELD WIPER

This invention relates to vehicle windshields in general, and specifically to a windshield wiper that is designed to retract to a shorter effective length as it is depressed parked.

BACKGROUND OF THE INVENTION

Vehicle windshield wiper systems often have a depressed park mechanism that reverses the wiper drive motor and rotates the wiper drive post an additional increment when the wiper system is turned off. This lowers the wiper from its normal inwipe position, where it forms a substantial angle with the windshield lower edge, to a park position where it is closer to, and more nearly parallel to, the lower edge. This puts the wiper farther out of view. Usually, there is no obstruction to prevent moving a fixed length wiper down to the park position. However, as windshields become more and more sloped or raked, a wiper that is long enough to Wipe sufficient area of the windshield may be so long that it would hit an obstruction if an attempt were made to park it at its normal, wiping length. This is especially true for the passenger side wiper of a pair of wipers that move back and forth in the familiar tandem pattern. The obstruction may be the side edge molding of the windshield itself, or another vehicle body component such as a hood hinge. Stated differently, there is only a limited space available along the lower windshield edge in which to park the wiper One proposed solution, disclosed in U.S. Pat. No. 4,780,926 to Kondo et al, is a single, center mounted wiper that is shortened by folding it back on itself jackknife fashion, and which is stowed in a central storage compartment. The wiper is folded by a rack and pinion mechanism that is in turn powered by a motor separate from the wiper drive motor. Another separate motor covers and uncovers the compartment. While the system avoids side edge obstruction, it could not be easily or practically adapted to most existing vehicle body styles. Very few vehicle bodies are designed to incorporate a single wiper. The extra motors represent added complexity, weight and expense. Another drawback is the possibility of the fold-up mechanism failing when the wiper is only partially unfolded. In such a half open position, the wiper would not work as it was swept back and forth, and would be very visually obtrusive.

A much more prevalent wiper system is the two wiper tandem system. A truly practical mechanism for avoiding parking obstruction of the passenger side wipe r would be one that worked in cooperation with such a wiper system without creating a radically different wiper motion or adding a great number of extra components and structure. It would also be a great advantage if the wiper had a fail safe feature, so that it could wipe even if the system failed to fully operate.

SUMMARY OF THE INVENTION

The invention provides a relatively simple solution to the obstruction problem that does work within the limitations of an existing tandem wipe pattern and wiper parking motion, with few extra components and no additional motors.

The wiper disclosed is incorporated in a vehicle body that has a highly sloped windshield. The driver side wiper is conventional and fixed in length. The passenger side wiper must be of a similar length to create a large enough wipe pattern, but would hit an obstruction if it remained at that length as it was depressed parked. To avoid collision, the passenger side wiper retracts automatically as it is parked, and extends again automatically to its operative length when the wiper system is turned on. The downward, incremental motion of the wiper that occurs only during depressed park is used to shorten the wiper.

In the preferred embodiment, a wiper blade assembly is hinged by a swinging linkage to a main wiper arm so that it can swing out to the extended position and be pulled back to the retracted position. As the wiper blade assembly moves, it stays parallel to the wiper arm, and does not move far from it. Interconnected to the swinging linkage is a mechanical actuator in the form of a four bar linkage. The four bar linkage, in turn, is continually pulled inwardly by a return means consisting of a tension spring that keeps the wiper swung out to the full extended position during the normal wipe pattern. Only when the wiper is parked does a striker hit part of the four bar linkage to push it out and swing the wiper blade assembly into the retracted position, in opposition to the spring. When the wiper system is turned on again, the return spring can pull the wiper blade assembly back to the extended position. Although it is unlikely, should the wiper blade assembly become stuck in either the retracted or extended position, or even in between, it would not intrude significantly into the driver's sight space, and could still wipe the windshield.

It is, therefore, a general object of the invention to prevent obstruction when a wiper is parked by shortening the wiper automatically as it is parked.

It is another object of the invention to shorten the wiper at park by automatically retracting it with an actuator that is operated simply by the usual wiper motion that occurs as the wiper is depress parked.

It is another object of the invention to provide a retractable and extendible wiper in which a wiper blade assembly moves in parallel fashion relative to a main arm, without departing significantly from its normal orientation.

It is another object of the invention to provide such a wiper in which the wiper blade assembly is swung between retracted and extended positions by a four bar linkage that is normally pulled in by a tension spring and pushed out by a striker only when the wiper is depressed parked.

BRIEF DESCRIPTION OF THE DRAWINGS

These and other objects and features of the invention will appear from the following written description, and from the drawings, in which:

FIG. 1 is is a perspective view of a portion of a vehicle body and windshield incorporating a preferred embodiment of the wiper of the invention;

FIG. 2 is a plan view of the wiper of the invention in its normal, extended position;

DESCRIPTION OF THE PREFERRED EMBODIMENT

Figure 3:
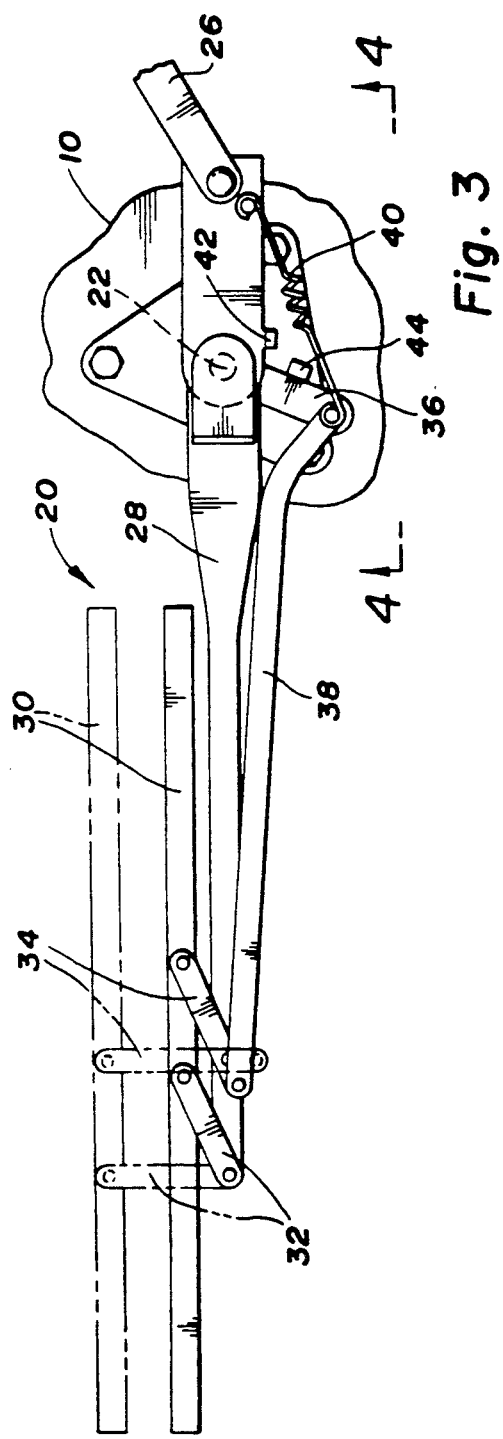
FIG. 3 is a plan view of the wiper of the invention in its retracted position.

Referring first to FIG. 1, a vehicle body 10 a steeply raked windshield 12 bounded by a transverse lower edge 14 and a pair of side edges 16. The lower edge 14 and side edges 16 create corners that are more obtuse than usual, and the length of windshield 12 measured between the lower edge 14 and the non-illustrated top edge is greater than usual. A pair of wipers, a driver side wiper 18 and a passenger wiper indicated generally at 20, are fixed to a pair of conventionally sited wiper drive posts 22. The wiper drive posts 22, in turn, are oscillated by a conventional drive motor 24 and linkage 26. As the drive posts 22 oscillate, the wipers 18 and 20 are swept back and forth simultaneously in the same direction over wipe patterns defined by inwipe positions $I_1$ and $I_2$ and outwipe positions $O_1$ and $O_2$ respectively, the so-called tandem pattern. In order to reach a sufficient area of the windshield, each wiper 18 and 20 must be fairly long. In the case of the passenger side wiper 20, this means that the inwipe position $I_2$ cannot be substantially parallel to the lower edge 14. Instead, it cuts across the corner, resting relatively high on the windshield 12. The drive motor 24 also incorporates a conventional depressed park mechanism designed to forcibly lower the wipers 18 and 20 an incremental amount to the solid line position. The space along lower edge 14 available to park driver side wiper 18 is not limited. However, the space available in which to park passenger side wiper 20, indicated at S, is limited by the presence of a non-illustrated hood hinge, and is less than the necessary wiping length of wiper 20.

Referring next to FIGS. 2 and 3, the structural details of passenger side wiper 20 are illustrated. Wiper 20 includes a main wiper arm 28 that is fixed to the wiper post 22, with a back end that extends beyond wiper post 22 to drive linkage 26. Arm 28 is swept back and forth over the general wipe pattern described above, but a wiper blade assembly 30 does the actual wiping. Blade assembly 30 is hinged to arm 28 by a pair of parallel pivoted links, a shorter link 32 and a longer link 34 that actually crosses arm 28. The links 32 and 34 support blade assembly 30 so that it can swing back and forth on arm 28 in parallel fashion. That is, blade assembly 30 can swing from an extended position, FIG. 2, to a retracted position, FIG. 3, while remaining substantially parallel to arm 28. In both the extended and retracted positions, blade assembly 30 rests close along side arm 28. Even in the intermediate dotted line position shown in FIG. 3, it never moves far from arm 28, and maintains the same basic, parallel relative orientation to arm 28. At its extended length, wiper 20 is long enough to wipe windshield 12 adequately, and at is retracted length, it is short enough to fit into space S. The mechanism that actuates wiper 20 is described next.

Figure 4:
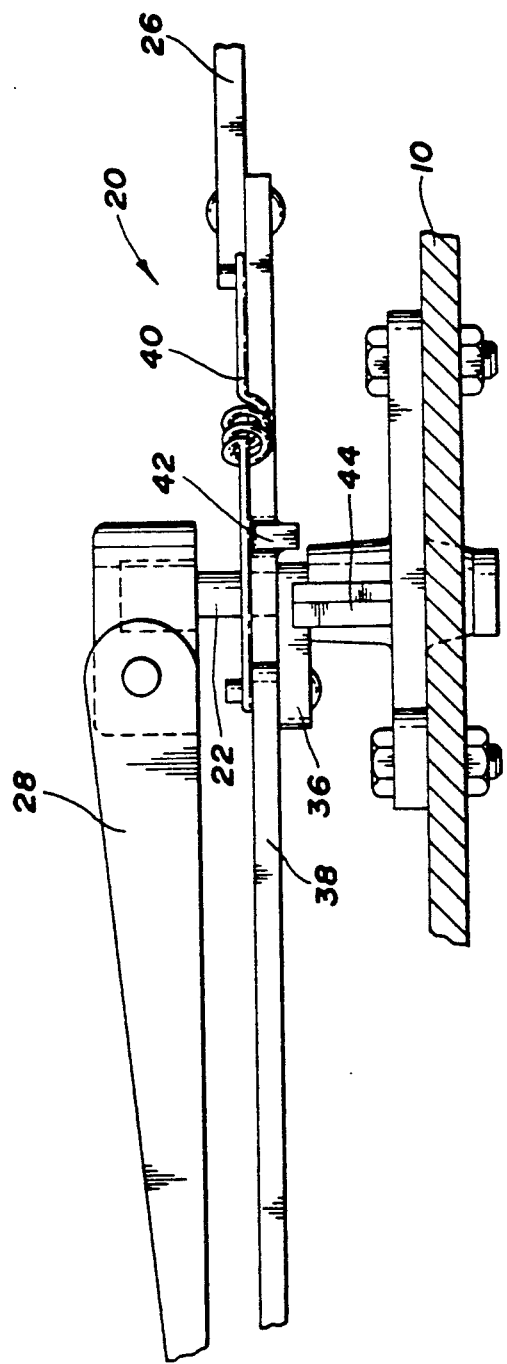
FIG. 4 is a side view of the wiper from the perspective of lines 4—4 of FIG. 3.

Referring next to FIGS. 3 and 4, a four bar linkage comprises a short kicker jink 36, one end of which is journaled on the drive post 22 and the other end of which is pivoted to a long extension link 38. The extension link 38 runs to the longer parallel link 34, and is pivoted to the shorter portion thereof that is located on the opposite side of arm 28 from the blade assembly 30. That shorter portion of the longer parallel link 34, the arm 28 itself, the kicker link 36 and the extension link 38 are interconnected so as to form the four elements of the four bar linkage that acts to swing the parallel linkage 32 and 34, and the blade assembly 30, between the extended and retracted positions. A passively acting return means in the form of a tension spring 40 hooked between arm 28 and the end of kicker link 36 applies a continual counterclockwise bias, pulling it tight against a depending flange 42 on arm 28. Over the entire wipe pattern, from $I_2$ to $O_2$ and back, spring 40 keeps the kicker link 36 pulled in, thereby keeping the blade assembly 30 in its extended position. Thus, wiper 20 effectively acts like a fixed length wiper, reaching the necessary area of windshield 12. A solid striker 44 on vehicle body 10 is located such that it does not touch any part of the linkage over the wipe pattern. However, as seen in FIG. 3, the extra increment of downward rotation at park forcibly drives the kicker link 36 into the striker 44, pushing it and the extension link 38 out in opposition to the stretching tension spring 40. The link 34 and blade assembly 30 ere thereby swung to the retracted position, short enough to fit within the space S as wiper 20 is parked.

Thus, the invention makes very efficient use of the already existing depressed parking action of wiper 20, automatically shortening wiper 20 when, and only when, necessary. No extra motors are needed, nor are the basic wipe cycle and parking action altered in any way. Similarly, the rising up of wiper 20 that occurs when the wiper system is again turned on allows spring 40 to automatically pull blade assembly 30 back to the extended position. The extension and retraction is unobtrusive to the vehicle occupants, because of its minimal, parallel motion. Moreover, should the blade assembly 30 somehow become trapped in either the extended or retracted position, or in between, it could still operate. That is, if some obstruction between kicker link 36 and stop flange 42 prevented spring 40 from fully extending, it would still wipe most of the required area of windshield 12. If blade assembly 30 stayed at the extended position as wiper 20 attempted to park, it would hit the obstruction. However, since blade assembly 30 is not solidly fixed to arm 28, the contact force could back drive the linkage and push the blade assembly 30 at least partially toward the retracted position. The lever arm available to back drive the linkage would not be as great as that available when the kicker link 36 hits the striker 44, but there would be at least some give, such as that provided by a snow clutch, to help prevent damage.

Variations in the preferred embodiment could be made. Mechanical actuators other than the striker 44 and the kicker link 36 could be used to push and pull on the extension link 38, and thereby swing the parallel links 32 and 34 back and forth. Such an actuator, for example, could be a reverse pivoted slotted crank in place of the kicker link 36 and a pin on vehicle body 10 instead of striker 44. The pin would enter the slot in the crank only when the arm 28 rotated farther down at park, rotating the crank and pushing on the extension link 38. This would have the same retracting effect, but with less impact loading than the striker 44 hitting kicker link 36. A different return means, such as a stiff clock spring wrapped around the wiper post 22, could be used to provide a continual rotational bias to kicker link 36. Or, the return means could be located elsewhere, so long as it acted between arm 28 and some part of the linkage to continually pull the blade assembly 30 toward the extended position. Therefore, it will be understood that it is not intended to limit the invention to just the embodiment disclosed.

The embodiments of the invention in which an exclusive property or privilege is claimed are defined as follows:

1. A wiper for use with a vehicle body having a windshield with a transverse edge, an oscillating wiper drive post located on said vehicle body along said transverse edge, and a depressed park mechanism adapted to rotate said wiper to a park position in which said wiper is substantially parallel to said transverse edge, and in which the wiper length necessary to wipe said windshield is substantially greater than the limited space available along said transverse edge in which to park said wiper, comprising,
- a wiper arm fixed to said wiper post so as to be swept thereby over a wipe pattern having an inwipe limit position in which said wiper forms a substantial angle with said transverse edge,
- a wiper blade assembly,
- a pair of parallel links mounting said wiper blade assembly to said wiper arm so as to swing said wiper blade assembly in parallel fashion relative to said wiper arm from a an extended position providing sufficient total wiper length to wipe said windshield to a retracted position short enough to fit within said limited space,
- a return spring continually pulling said wiper blade assembly to its extended position during said wipe pattern, and,
- an actuator engageable with said parallel links only in response to said wiper moving from inwipe to park position to push said linkage in opposition to said return means and swing said wiper blade assembly to its retracted position,
- whereby said wiper covers sufficient area of said windshield during said wipe pattern, but retracts so as to fit within said available parking space when said wiper is depressed parked.

2. A wiper for use with a vehicle body having a windshield with a transverse edge, an oscillating wiper drive post located on said vehicle body along said transverse edge, and a depressed park mechanism adapted to rotate said wiper to a park position in which said wiper is substantially parallel to said transverse edge, and in which the wiper length necessary to wipe said windshield is substantially greater than the limited space available along said transverse edge in which to park said wiper, comprising,
- a wiper arm fixed to said wiper post so as to be swept thereby over a wipe pattern having an inwipe limit position in which said wiper forms a substantial angle with said transverse edge,
- a wiper blade assembly,
- a pair of parallel links mounting said wiper blade assembly to said wiper arm so as to swing said wiper blade assembly in parallel fashion relative to said wiper arm from an extended position providing sufficient total wiper length to wipe said windshield to a retracted position short enough to fit within said limited space,
- a four bar linkage interconnected to said parallel links,
- a return spring continually pulling said four bar linkage so as to swing said parallel links and said wiper blade assembly to its extended position during said wipe pattern,
- a striker engageable with said four bar linkage only in response to said wiper moving from inwipe to park position to push said four bar linkage in opposition to said return means and swing said parallel links and said wipe blade assembly to its retracted position,
- whereby said wiper covers sufficient area of said windshield during said wipe pattern, but retracts so as to fit within said available parking space when said wiper is depressed parked.

* * * * *